US005675135A

United States Patent [19]

Martin

[11] Patent Number: 5,675,135

[45] Date of Patent: Oct. 7, 1997

[54] ELECTRONIC FRANKING MACHINE HAVING IMPROVED SECURITY CAPABILITIES

[75] Inventor: Claude Martin, Saint Germain En Laye, France

[73] Assignee: SECAP, Boulogne Billancourt, France

[21] Appl. No.: 517,874

[22] Filed: Aug. 22, 1995

[30] Foreign Application Priority Data

Sep. 1, 1994 [FR] France .................................. 94 10531

[51] Int. Cl.[6] .............................. G06K 5/00; G06K 7/06; G06K 7/04

[52] U.S. Cl. .......................... 235/380; 235/442; 235/445; 235/489

[58] Field of Search .................................... 235/442, 445, 235/489, 50, 61.11, 380; 271/241; 225/93

[56] References Cited

U.S. PATENT DOCUMENTS

| | | | |
|---|---|---|---|
| 1,761,682 | 6/1930 | Reynolds | 235/442 |
| 3,052,150 | 9/1962 | Jonker | 235/489 |
| 3,521,813 | 7/1970 | Buckler | 235/489 |
| 3,677,453 | 7/1972 | Parks | 225/93 |
| 3,851,152 | 11/1974 | Nii | 235/61.11 |
| 4,036,430 | 7/1977 | Eppich | 235/61.11 |
| 4,128,237 | 12/1978 | Bechtiger | 271/241 |
| 4,297,566 | 10/1981 | Ahmann | 235/50 R |
| 4,901,241 | 2/1990 | Schneck | 364/464.02 |

FOREIGN PATENT DOCUMENTS

| | | |
|---|---|---|
| A 0 328 057 | 8/1989 | European Pat. Off. . |
| A 29 16 207 | 11/1980 | Germany . |
| 2 173 738 | 10/1986 | United Kingdom . |
| 2 251 210 | 7/1992 | United Kingdom . |
| 93 21610 | 10/1993 | WIPO . |

*Primary Examiner*—Donald T. Hajec
*Assistant Examiner*—Douglas X. Rodriguez
*Attorney, Agent, or Firm*—Kenyon & Kenyon

[57] ABSTRACT

An electronic franking machine has a data reader for reading data stored in a microcircuit fitted in a chip card and includes a receptacle with respect to which are disposed a predetermined location and a punching mechanism.

9 Claims, 3 Drawing Sheets

ELECTRONIC FRANKING MACHINE HAVING IMPROVED SECURITY CAPABILITIES

BACKGROUND OF THE INVENTION

The present invention relates to electronic franking machines.

The aim of the invention is to ensure the security of transactions which, for these machines, involve the reception of computer data.

SUMMARY OF THE INVENTION

In accordance with the present invention an electronic franking machine, comprises:

- a means for reading data stored in a microcircuit fitted in a chip card including a card, and receptacle;
- a punching means disposed in a predetermined position with respect to the receptacle, having a punch able to move between an idle position where it is outside a space for receiving a card and an activated position where it passes through the said space; and
- control means for determining if the data stored in said microcircuit of said chip card, which has just been introduced into the reading means conform to a predetermined criterion, and to control, as a result, the said punching means; wherein said chip card has a hole through its thickness in a predetermined position corresponding to that of the punching means with respect to the receptacle.

The invention gives protection which is at least partially physical, since it involves the physical medium for the data which the card constitutes, which it causes to cooperate mechanically with the movable punch.

Preferably, the said control means control the said punching means so that, if the said predetermined criterion is satisfied, the said punch passes from the said idle position to the said activated position and then returns to the idle position.

With these characteristics, the invention makes it possible, for example, to check that the card introduced into the machine bears an identification number corresponding to that of the machine and, if this is indeed the case, to perforate a paper label stuck on the card in the position of the hole, the perforation of the label being a physical indication that the card has been inserted into the machine for which it is intended.

Preferably, for reasons of simplicity, convenience and economy:

- the said punching means is an electromagnet equipped with a plunger with a pointed end,
- the said predetermined position of the punching means is situated in line with a connector on the said receptacle, a connector which is suitable for cooperating with a connector on the said card,
- the said receptacle is suitable for cooperating with a chip card whose format and connector and the position of the latter are standardized.

BRIEF DESCRIPTION OF THE DRAWINGS

The disclosure of the invention will now be continued by describing an example of an embodiment given below, as illustrative and non-limitative, with reference to the accompanying drawings, in which.

DETAILED DESCRIPTION

Figure 1:
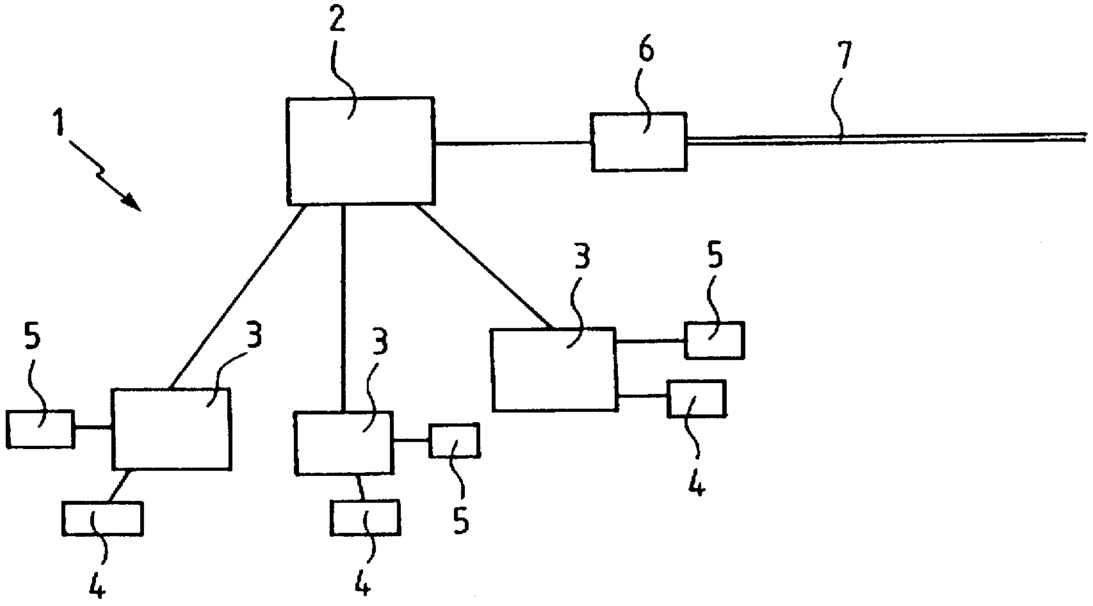
FIG. 1 shows diagrammatically a computerised control centre having responsibility for a set of electronic franking machines, with which it communicates as explained below.

The centre 1 shown on FIG. 1 has a computer complex consisting of a server computer 2 to which are connected three management computers 3 to each of which is connected a chip card reader/encoder 4 and a label printer 5. A modem 6 is directly linked to the computer 2 and is connected to a telephone line 7 which is dedicated to it.

Figure 2:
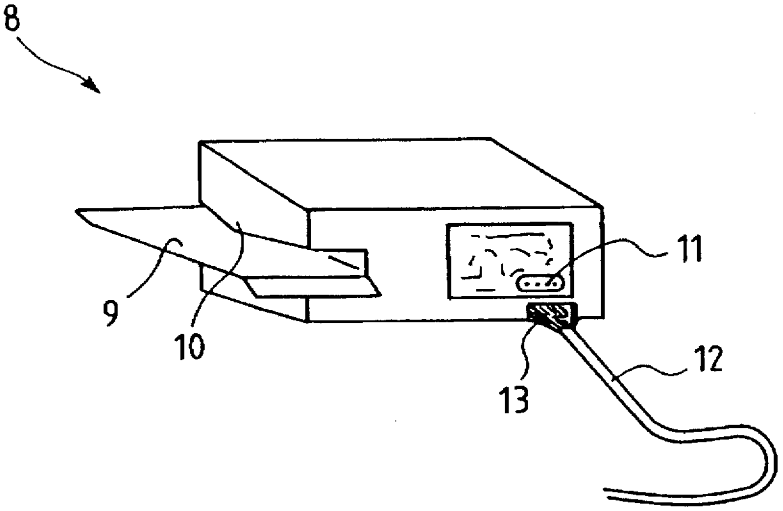
FIG. 2 is a diagrammatic perspective view of one of these franking machines, shown in an initialisation phase.
Figure 4:
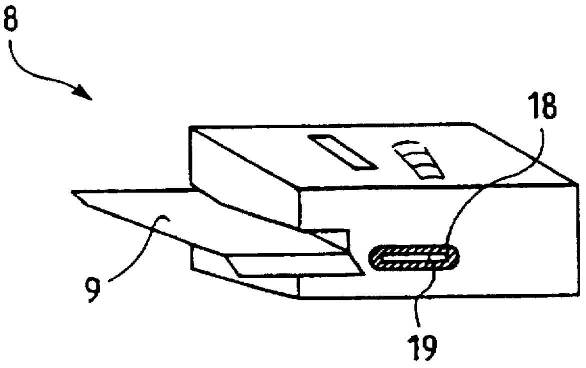
FIG. 4 is another perspective view of the franking machine illustrated in FIG. 2, showing the external part of its chip card reader/encoder.

The franking machine 8 shown in particular on FIGS. 2 and 4 has in a conventional fashion a tray 9 for guiding the object on which the franking is to be printed by a head 10 situated above the plate 9, and various other customary elements, not shown, in particular a keypad and a balance, and internal control and management circuits driven by a microcontroller provided with franking management software of a known type, corresponding for example to that described in French patent application 93-04694 belonging to the Applicant.

In addition to these conventional elements, the machine 8 has a connector 11 by means of which its internal circuits are accessed, in order to carry out an initialisation operation by connecting these circuits to the computers at the centre 1 using the cable 12, one end of which has a connector 13 suitable for cooperating with the connector 11, the other end of the cable 12 being connected directly to one of the computers at the centre 1 when the initialisation operation is carried out locally, or by means of a secure data transmission line when the operation is carried out remotely. In normal service, the connector 11 is shielded by a tamper-proof protective cover.

Figure 3:
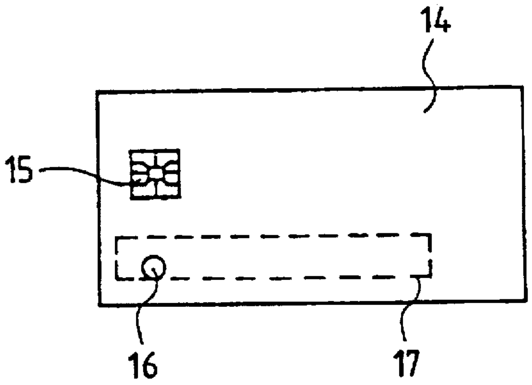
FIG. 3 is a plan view of the chip card which is used to transmit information between the centre and the machines.

The machine 8 has yet more elements, described later, which enable it to cooperate with the chip card 14 shown in FIG. 3.

The format of this card, its connector 15 and the location of the latter are in accordance with those standardised by ISO. It is fitted with a microcircuit (not shown) of the non-volatile, re-writable RAM type, of the EEPROM kind, or equivalent. This microcircuit does not have any logic input protection, which means that the reading and writing of data on the card 14 are completely free.

In line with the connector 15, the card 14 has a hole 16 through its thickness, this hole being covered in certain cases, mentioned below, by a label printed with one of the printers 5 at the centre 1, and stuck in the location shown on FIG. 3 by the frame 17 in broken lines.

Figure 5:
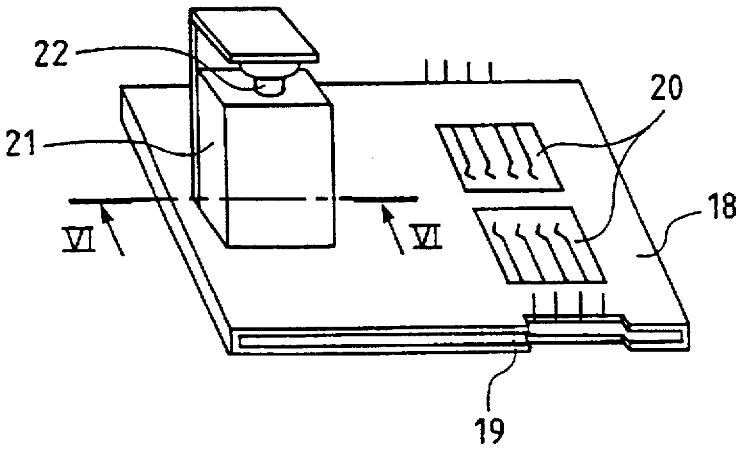
FIG. 5 is a perspective view showing, enlarged in comparison with FIG. 4, the card reader/encoder receptacle and certain elements which are associated with it.
Figure 6:
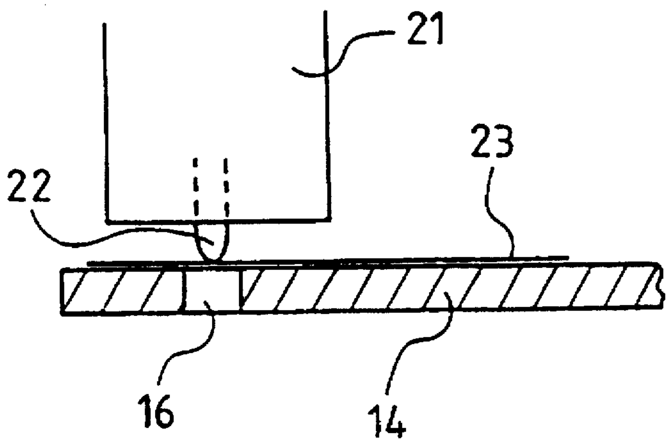
FIG. 6 is a partial elevation view in section along the plane marked VI—VI on FIG. 5.

As shown in FIGS. 4 to 6, the franking machine 8 has an element 18 for receiving the card 14, which opens to the outside through a slot 19, the receptacle 18 being associated, as shown in FIG. 5, with a two-part connector 20 which is activated when the card is fully pushed in, and an electromagnet 21 fitted with a plunger 22 terminating in a point (see FIG. 6), the plunger 22 being designed to pass through the hole 16 in the card 14 when activated, and therefore to perforate, at the position of the hole 16, any label 23 which may be stuck on the card 14 at the location 17.

In addition to the conventional franking management software mentioned above, the microcontroller driving the management and control circuits of the machine 8 is also provided with additional software which enables this same microcontroller to manage the various operations connected with the transmission of information carried out by means of the card 14, operations which will now be described.

To initialise the machine 8, a record is opened in the computers at the centre 1, which includes the references of a user duly listed and authorised to use the machine, and a computer at the centre 1 is linked to the connector 11 as indicated previously.

A set of different random numbers, for example 250 numbers of ten decimal digits, is secretly allocated to the machine 8, the number of the machine and the series of 250 numbers is recorded in the record at the centre, and these same data are transmitted to the machine 8, which automatically records them on permanent (non-volatile) memories, each number being associated, whether this is in the record at the centre or in the machine memories, with an index which may take at least the states zero and one, and which is set at this stage to the zero state.

The file element of the 250 secret random numbers is recorded securely at the centre 1 so that non-authorised personnel are not able to access them, even during maintenance operations.

During initialisation, a value with which the down counter in the machine must be reloaded when the latter receives a reload instruction from the centre is also recorded in the record at the centre and in the machine 8.

When the initialisation operation is complete, the machine 8 is again enclosed in its security cover, which is itself sealed with a tamper-proof seal, and the machine is ready to be put into service.

Once the machine 8 has been installed at the site where it is to be used, in order to function it needs to receive, via the card 14, an instruction for reloading its down counter, which is at zero.

This instruction is actually given by the reception of one of the 250 numbers contained in the memory registers of the machine 8, provided that it has not already been used.

In the embodiment of FIGS. 1 to 6, the issuing of the card 14 containing the instruction authorising the reloading of the down counter is undertaken by the centre 1.

For this, when authorization is requested from it by mail or telephone, after verification that the required conditions are fulfilled (payments of money made, or any other condition), the centre uses one of the readers/encoders 4 to write in the memory of a card 14 a number of items of information intended to indicate the machine for which it is intended, in particular the number of that machine, and one of the secret numbers, not yet used (index at zero), from among the 250 which are allocated to that machine, the index of the number sent then being set to one to show that it has been used.

Moreover, using a printer 5, a self-adhesive label 23 is printed in clear with data identifying the machine for which the authorization is intended and, when the card 14 has been coded, this label is stuck to the location 17 where it blocks off the opening 16, this label being produced with a background printing which enables its origin to be recognised and limits the risks of it being replaced with fraudulent intent.

After having prepared the card 14 in this way, the centre 1 dispatches it, for example by carrier or post, to the site where the machine 8 is located, and on reaching this site, the card 14 is inserted into the receptacle 18, the connectors 20 are activated when the card is fully pushed in, the data present on the card are read and sent to the internal circuits of the machine, these check whether the identification number appearing in the data which have just been received match the identification number which was assigned to it in the initialisation phase, if this is indeed the case, the circuits operate the electromagnet 21 so that the plunger 22 descends then rises again, that is to say to make it move from its rest position where it is outside the space for receiving the card 14 which opens to the outside through the slot 19, to an activated position where it crosses this space, then to the rest position, in such a way that it perforates the label 23 at the position of the hole 16, the circuits investigate whether the number appearing in the data which have just been read is among the secret numbers kept in its memory registers, and if the machine finds this number there associated with an index at the zero state, it sets the latter to the one state, and reloads its down counter from the reload value which was allocated to it during the initialisation operations.

The reload value may of course naturally vary from one machine to another, in view of anticipated consumption or any other consideration, but for a given machine it cannot be modified remotely.

As a variant, provision is made in the initialisation phase for several series of different random numbers, each with a distinct corresponding counter reload value, the machine using the value corresponding to the series to which the secret number which it has just received belongs, when it reloads its counter.

In other variants, the same method is used for other counters controlling the use of the machine 8, for example for authorising the machine to operate for a predetermined time, or for authorising it to operate until the up counter has reached a value calculated by adding the reload value to the value which this counter had when reloading was carried out.

In view of the fact that re-use of a secret number is prevented, counter reloading, after initialisation, can be carried out only a number of times equal to the quantity of secret numbers allocated during the initialisation phase, which is 250 in the present example. In cases where the machine is still to be used, it is then necessary to carry out a fresh initialisation operation.

In the preceding description of the example embodiment of FIGS. 1 to 6, it is the centre 1 which is the sender of information to be transmitted, and the machine 8 which is the addressee or receiver of it, but it is also possible to have the machine 8 as sender and the centre 1 as addressee, in particular in order to transmit to the latter a reading of the up counter or other data stored in the machine 8, for example statistics of use of the various franking blocks, the machine 8 transmitting the data to the centre 1 for example in response to a command written by the centre on the card at the same time as the counter reload instruction.

Given that the card 14 may be written to freely, it is preferable to also make provision therein for a data authentication means, in order to be certain that the data read at the centre 1 are indeed those which were written by the required machine 8.

Thus, for Example, provision may be made that during the initialisation phase of the machine 8, it is given a set of secret numeric keys for an algorithm suitable for producing a cryptogram from data and one of the keys in question, these being stored in the record which the centre 1 holds for the machine 8, in its secure part, and in the memory registers of the machine 8. One of the secret keys being chosen, the machine calculates the cryptogram from the data which it is sending, and writes it on the card at the same time as the data, the centre 1, after having read the data, re-executing the same calculation and verifying that the cryptogram which it obtains correctly matches that which is present on the card.

Naturally, in cases where the data might have been modified with a fraudulent aim, the absence of correspondence between the cryptograms would reveal the fraud.

In order to choose the key used for transmission, a first one may be determined for example during the initialisation operations, and provision made for commands which the centre can transmit to the machine 8 for the latter to use another of the keys which it keeps in memory.

Of course, the calculation of the authentication cryptogram is carried out by the internal electronic circuits of the machine 8, the algorithm being contained in the additional software with which the microcontroller is provided, this algorithm being for example of the DES type.

The ability to make the machine 8 return data to the centre 1 may in particular be used to carry out, on command, as indicated above, reading of the up counter, in order to invoice the machines according to their actual consumption.

It may also serve to provide control of maintenance of the machines: for this, a card is issued by the centre and sent to the organisation responsible for maintenance. This card carries the number of the machine to be checked, and a deadline for carrying out the check. A technician must then go to the machine, insert the card in it, which will write the information required on the state of the said machine. Proof of the action will be given by the return of the card to the centre 1.

It is also possible that the sender to be authenticated is the centre 1. In this case, if it has no data to be transmitted or if they are insufficient in number, it generates a series of characters randomly, calculates the cryptogram on the basis of these, and writes both the series of characters and the cryptogram, the latter being verified on arrival by the machine 8.

Figure 7:
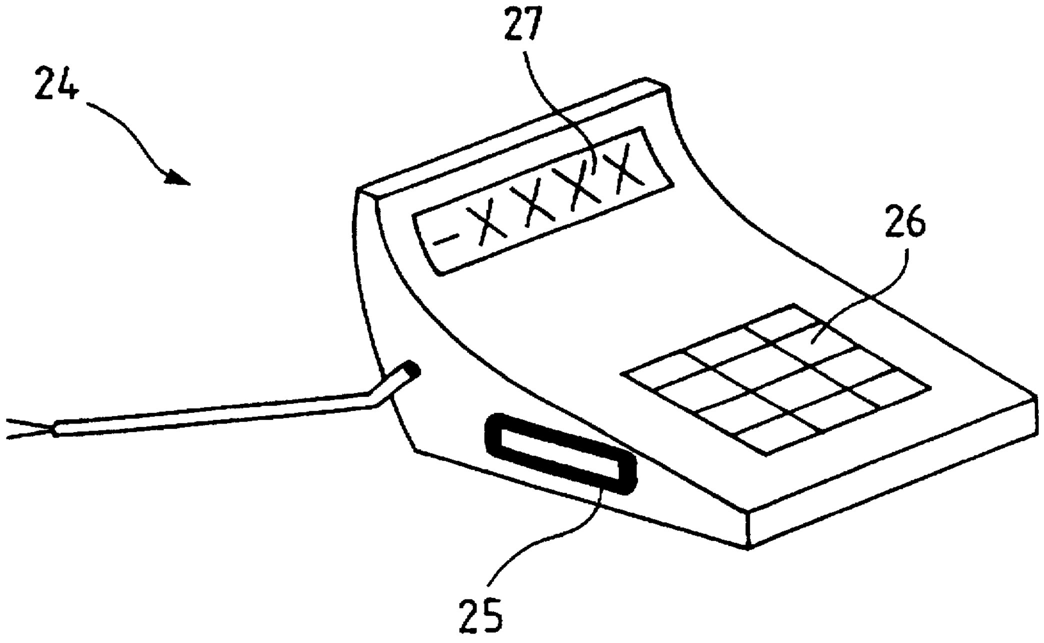
FIG. 7 is a diagrammatic perspective view illustrating diagrammatically a data communications terminal capable of being connected through the telephone network to the control centre shown on FIG. 1.

In another embodiment, explained below with the help of FIGS. 1 and 7, it is not the readers/encoders 4 provided at the centre 1 which are used by the latter to write or read information on the card 14, but the data communications terminal 24 shown on FIG. 7, which is present on a site where there are a number of machines 8, this site being remote from the centre 1. The terminal 24 has in a single housing at least one chip card reader/encoder 25, of the same kind as the reader/encoder 4 in the centre 1 or as the one which is provided in the machines 8 and which has a receptacle 18 for the card. In addition to the reader/encoder 25, the terminal 24 has logic control circuits and a modem, and possibly, as in the example shown in FIG. 7, a keypad 26 and a screen 27.

The logic control circuits are sensitive to the insertion of a card in the reader/encoder 25, recognise the type of card inserted and verify that the card contains the appropriate identification information. According to the information read on the card (see later), the control circuits may start the execution of a card read operation or a write operation, or automatically call the centre 1 by means of the modem to request a transaction, to transmit information to the centre or receive some from it.

On the site where the terminal 24 and the various machines 8 are located, provision is made for one card 14 per machine, the memory of which has the identification number of that machine through an initialisation carried out by the centre 1, without the latter producing a label with the printer 5 nor sticking one to the location 17, and more generally, in the variant using the terminal 24, no label is stuck on the cards 14 used. Apart from this difference, the transmission of information is similar to that of the first embodiment apart from the fact that the reader/encoder 25 is connected to the computer 2 not by means of a management computer 3, but by means of the public telephone network 7 and the modem 6.

From the point of view of the user, whereas to obtain a counter load instruction when the card is issued by the centre he must make a request by telephone, letter, fax or telex and wait for the card to be created by the centre during its opening hours and finally sent to the site by post or carrier, the fact of having a data communications terminal 24 available enables a reload instruction to be obtained in a few moments and at any time.

To obtain such an instruction, the card belonging to the machine which needs it is inserted in the latter, the card being recognised, the machine 8 will record, on the card 14 belonging to it, its state, and in particular the value of certain of its counters, and the cryptogram for use.

The user then withdraws the card from the machine, and inserts it in the terminal. The latter recognises the card, and calls the centre using its modem, the communication passing through the public telephone network 7 and through the modem 6 of the centre 1, the data transmitted being those which are written in the memory of the card 14.

After having received the data, the centre 1 verifies their authenticity using the cryptogram, and if all conditions are fulfilled, it sends a message by return including the data to be written on the card to constitute a counter reload instruction, and in particular one of the 250 numbers still valid.

The user recovers the card from the terminal and again inserts it in the machine, which carries out the same operations as described above up to the reloading of its counter, it then being possible to write certain data onto the card so that the process repeats when it is again necessary to request another counter reload instruction.

Numerous variants are possible according to circumstances, and in this respect it should be stated that the invention is not limited to the examples described and depicted.

I claim:

1. An electronic franking machine comprising:

means for reading data stored in a microcircuit fitted in a chip card, said means for reading including a receptacle for receiving said chip card;

a punching mechanism disposed in a predetermined position with respect to the receptacle, having a punch able to move between an idle position where it is outside a space for receiving said chip card and an activated position where it passes through said space for receiving said chip card; and a controller that determines if the data stored in said microcircuit of said chip card, just after introduction of said chip card into the receptacle, conform to a predetermined criterion, and to control, as a result, said punching mechanism;

wherein said chip card is made with a hole through its thickness in a predetermined position corresponding to that of the punching mechanism with respect to the receptacle.

2. The machine of claim 1, wherein said controller controls the said punching mechanism so that, if the said predetermined criterion is satisfied, the said punch passes from the said idle position to the said activated position and then returns to the idle position.

3. The machine according to either one of claims 1 or 2, wherein said punching mechanism includes an electromagnet fitted with a plunger terminating in a point.

4. The machine according to either one of claims 1 or 2, wherein said predetermined position of the punching mechanism is situated in line with a connector on the said receptacle, said connector being suitable for cooperating with a connector on the said chip card.

5. The machine according to either one of claims 1 or 2, wherein said receptacle is suitable for cooperating with a chip card whose format and connector and the position of the latter are standardized.

6. The machine according to claim 3, wherein said predetermined position of the punching mechanism is situated in line with a connector on the said receptacle, said connector being suitable for cooperating with a connector on the said chip card.

7. The machine according to claim 3, wherein said receptacle is suitable for cooperating with a chip card whose format and connector and the position of the latter are standardized.

8. The machine according to claim 4, wherein said receptacle is suitable for cooperating with a chip card whose format and connector and the position of the latter are standardized.

9. The machine of claim 1, wherein a label is affixed to a surface of said chip card and is positioned so as to mask said hole.

* * * * *

UNITED STATES PATENT AND TRADEMARK OFFICE
CERTIFICATE OF CORRECTION

PATENT NO. : 5,675,135

DATED : October 7, 1997

INVENTOR(S) : Claude MARTIN

It is certified that error appears in the above-identified patent and that said Letters Patent is hereby corrected as shown below:

Column 5, line 1, change "Example" to --example--.

Signed and Sealed this

Twelfth Day of May, 1998

Attest:

BRUCE LEHMAN

*Attesting Officer*

*Commissioner of Patents and Trademarks*